United States Patent
Fried et al.

(10) Patent No.: US 8,904,174 B2
(45) Date of Patent: Dec. 2, 2014

(54) SYSTEM, METHOD AND COMPUTER PROGRAM PRODUCT FOR PRODUCT LICENSE MANAGEMENT

(75) Inventors: Eric P. Fried, Austin, TX (US); Perinkulam I. Ganesh, Round Rock, TX (US); Lance W. Russell, Rosanky, TX (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 13/053,387

(22) Filed: Mar. 22, 2011

(65) Prior Publication Data

US 2012/0246474 A1    Sep. 27, 2012

(51) Int. Cl.
*G06F 21/00* (2013.01)
*H04L 29/06* (2006.01)
*G06F 21/10* (2013.01)
*H04L 12/24* (2006.01)

(52) U.S. Cl.
CPC .......... *G06F 21/105* (2013.01); *H04L 63/0428* (2013.01); *H04L 2463/101* (2013.01); *H04L 63/104* (2013.01)
USPC ............... 713/168; 713/170; 726/27; 726/33; 380/277; 709/226; 711/145

(58) Field of Classification Search
USPC ................... 713/168, 170; 709/226; 711/145; 380/277; 726/33, 27
See application file for complete search history.

(56) References Cited

U.S. PATENT DOCUMENTS

| | | | |
|---|---|---|---|
| 5,666,486 A | | 9/1997 | Alfieri et al. |
| 5,758,068 A | * | 5/1998 | Brandt et al. .................... 726/27 |
| 6,243,692 B1 | | 6/2001 | Floyd et al. |
| 7,707,116 B2 | | 4/2010 | Walker et al. |
| 2004/0093469 A1 | * | 5/2004 | Glasco .......................... 711/145 |
| 2004/0260654 A1 | | 12/2004 | Doll-Steinberg |
| 2005/0289072 A1 | | 12/2005 | Sabharwal |
| 2006/0059561 A1 | | 3/2006 | Ronning et al. |

(Continued)

FOREIGN PATENT DOCUMENTS

EP    1486849 A1 * 12/2004

OTHER PUBLICATIONS

Patidar, S.; Rane, D.; Jain, P.; "Challenges of software development on cloud platform"; Information and Communication Technologies (WICT), 2011 World Congress on DOI: 10.1109/WICT.2011. 6141386; Publication Year: Aug. 2011; pp. 1009-1013.*

(Continued)

*Primary Examiner* — Andrew Nalven
*Assistant Examiner* — Courtney Fields
(74) *Attorney, Agent, or Firm* — James L. Baudino

(57) ABSTRACT

According to one aspect of the present disclosure, a method and technique for product license management for a clustered environment having a plurality of nodes is disclosed. The method includes unlocking a product on a first node of the plurality of clustered nodes; responsive to unlocking the product on the first node, indicating an unlocked status of the product on a shared storage device accessible to the plurality of clustered nodes; and transmitting a self-unlock message from the first node to remaining nodes of the cluster to enable the remaining nodes of the cluster to self-unlock the product on the respective remaining nodes based on the status indication of the shared storage device.

20 Claims, 4 Drawing Sheets

(56) References Cited

U.S. PATENT DOCUMENTS

| | | |
|---|---|---|
| 2007/0033395 A1 | 2/2007 | MacLean |
| 2008/0082446 A1 | 4/2008 | Hicks et al. |
| 2009/0132422 A1 | 5/2009 | Booth et al. |
| 2009/0177740 A1 | 7/2009 | Curren |
| 2010/0043075 A1 | 2/2010 | Byers |
| 2010/0086134 A1* | 4/2010 | Ureche et al. ............ 380/277 |
| 2010/0250389 A1 | 9/2010 | Augustin et al. |
| 2011/0072267 A1* | 3/2011 | Johansson ................ 713/170 |
| 2011/0162091 A1* | 6/2011 | Huang ........................ 726/33 |
| 2012/0239814 A1* | 9/2012 | Mueller et al. ............ 709/226 |

OTHER PUBLICATIONS

Dalheimer et al.; GenLM: License Management for Grid and Cloud Computing Environments; 9th IEEE/ACM International Symposium on Cluster Computing and the Grid; 2009; pp. 132-139.

\* cited by examiner

SYSTEM, METHOD AND COMPUTER
PROGRAM PRODUCT FOR PRODUCT
LICENSE MANAGEMENT

BACKGROUND

Distributed computer systems have the capability of sharing resources. "Clustering" generally refers to a computer system organization where multiple computing platforms, or nodes, are networked together to cooperatively perform computer tasks.

Generally, software is utilized in a computer system pursuant to a license. Such licenses generally impose restrictions on its use, such as limiting the number of computers that may run the software or limiting the number of users that may utilize the software. For example, in some cases, a unique encrypted key either accompanies the software product or is distributed separately as a part of a purchase of the software product. The software may prompt for and match various criteria against encoded information in the key. In a clustered network environment, the licensed software product oftentimes must be managed across the various nodes of the cluster, which may be time-consuming and/or require special administrative operations.

BRIEF SUMMARY

According to one aspect of the present disclosure a method and technique for product license management in a clustered environment having a plurality of nodes is disclosed. The method includes unlocking a product on a first node of the plurality of clustered nodes; responsive to unlocking the product on the first node, indicating an unlocked status of the product on a shared storage device accessible to the plurality of clustered nodes; and transmitting a self-unlock message from the first node to remaining nodes of the cluster to enable the remaining nodes of the cluster to self-unlock the product on the respective remaining nodes based on the status indication of the shared storage device.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
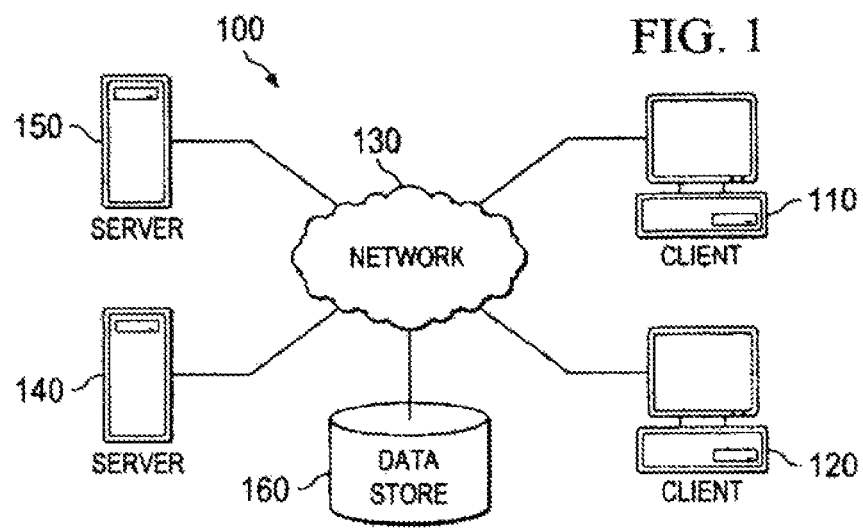
FIG. 1 is an embodiment of a network of data processing systems in which the illustrative embodiments of the present disclosure may be implemented.

Embodiments of the present disclosure provide a method, system and computer program product for product license management in a clustered environment having a plurality of nodes. For example, in some embodiments, the method and technique includes unlocking a product on a first node of the plurality of clustered nodes, responsive to unlocking the product on the first node, indicating an unlocked status of the product on a shared storage device accessible to the plurality of clustered nodes; and transmitting a self-unlock message from the first node to remaining nodes of the cluster to enable the remaining nodes of the cluster to self-unlock the product on the respective remaining nodes based on the status indication of the shared storage device. The method and technique enables product unlocking pursuant to a licensing scheme to be issued from one node of the clustered network such that product unlocking permeates to the remaining nodes on the cluster without external assistance from a user or administrator.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
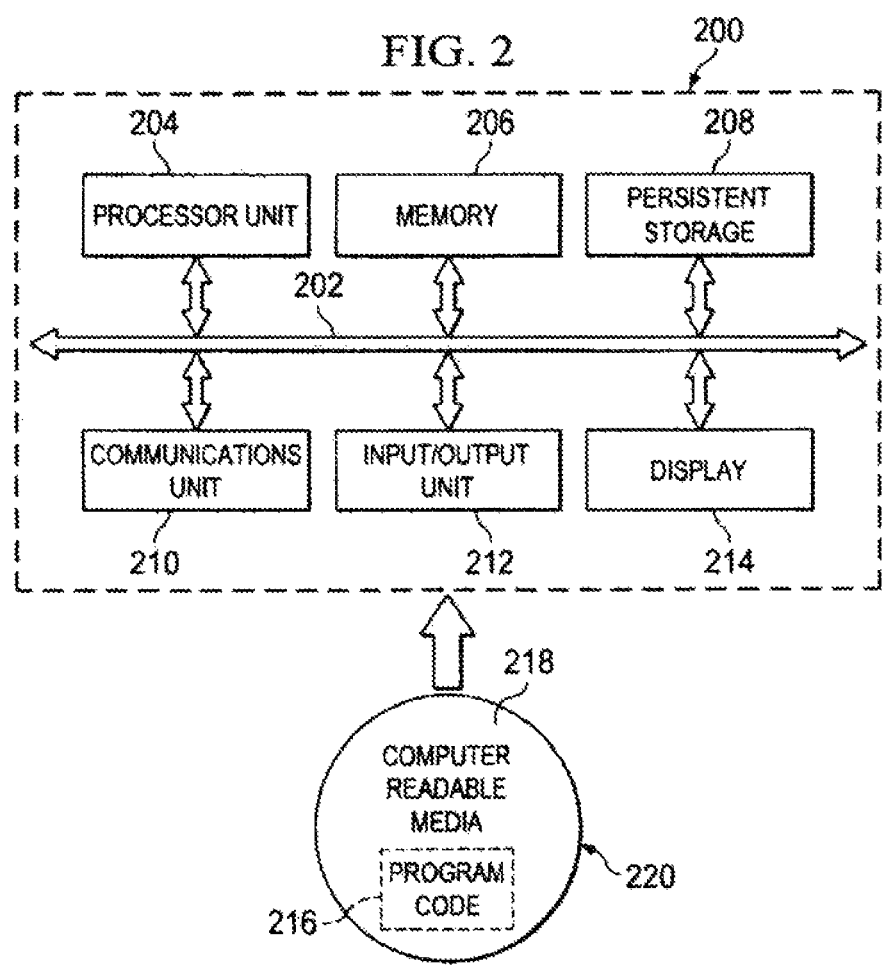
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a product license management system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
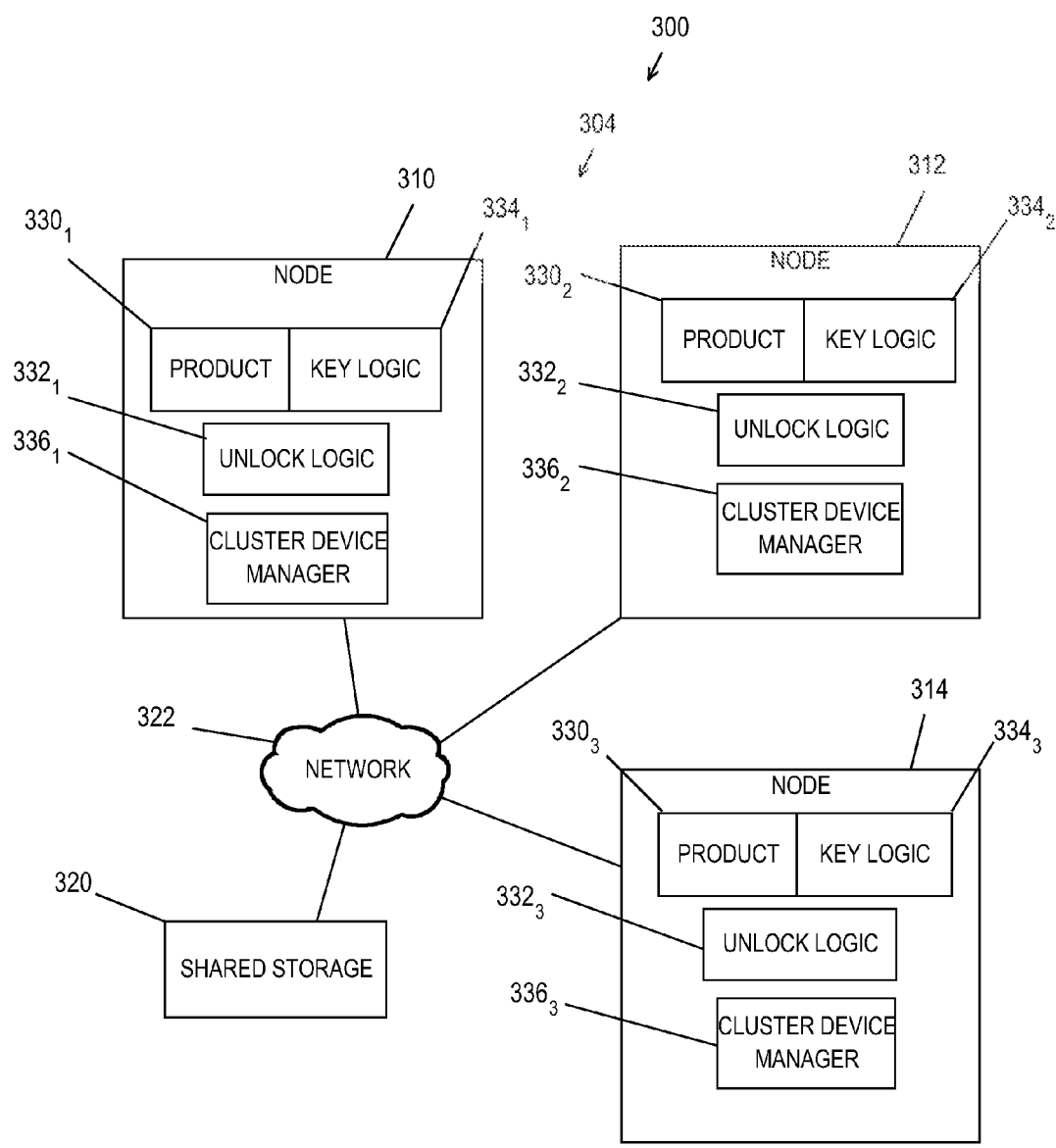
FIG. 3 is a diagram illustrating an embodiment of a data processing system in which illustrative embodiments of a product license management system may be implemented.

FIG. 3 is an illustrative embodiment of a system 300 for product license management. System 300 may be implemented on data processing systems or platforms such as, but not limited to, servers 140 and/or 150, clients 110 and/or 120, or at other data processing system locations. In the embodiment illustrated in FIG. 3, system 300 comprises a clustered network environment 304 including nodes 310, 312 and 314 and a shared storage device 320 connectable to each other via a network 322. Any number of network topologies may be used for network 322 such as, but not limited to, a high speed point-to-point bus, a LAN, a WAN, a storage area network (SAN), a public network such as the Internet, and combinations thereof. Nodes 310, 312 and 314 may be physically located in close proximity to each other or remotely located. Nodes 310, 312 and 314 may comprise servers, workstations, or other types of computing platforms (e.g., such as servers 140 and/or 150, clients 110 and/or 120, or data processing system 200 as depicted in FIGS. 1 and 2). Shared storage device 320 may comprise a single storage device or a SAN for connecting nodes 310, 312 and 314 to one or more storage mediums, such as a storage disk. In the embodiment of FIG. 3, three nodes are illustrated; however, it should be understood that a greater or fewer quantity of nodes may be clustered in the clustered network environment. Further, it should be understood that a greater quantity of shared storage devices may be provided.

In some embodiments, each of nodes 310, 312 and 314 include a mechanism to enable self-unlocking of a licensed product located thereon. For example, in the embodiment illustrated in FIG. 3, nodes 310, 312 and 314 each respectively include a product $330_{1-3}$ subject to license restrictions or management, unlock logic $332_{1-3}$, key logic $334_{1-3}$ and a cluster device manager $336_{1-3}$. Unlock logic 332, key logic 334 and cluster device manager 336 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). For example, in some embodiments, unlock logic 332 may comprise an application programming interface (API) for unlocking product 330 and/or checking the unlocked status of product 330, and key logic 334 may comprise an object file that provides an API for creating and/or generating a unique key and encrypting the key. Key logic $334_{1-3}$ may be provided on respective nodes 310, 312 and 314 based on the acquisition and/or compliance with various license terms (e.g., loaded onto a respective node in response to the purchase or acquisition of a license). Thus, in some embodiments, key logic $334_{1-3}$ is linked to a particular instance of product $330_{1-3}$, respectively, such that, responsive to a request to unlock a respective product $330_{1-3}$, key logic $334_{1-3}$ generates a unique encrypted key and passes the key to respective unlock logic $332_{1-3}$. Unlock logic $332_{1-3}$ decrypts the key and authenticates the key to the respective product $330_{1-3}$. If authentication is successful, unlock logic $332_{1-3}$ unlocks the respective product $330_{1-3}$.

In some embodiments, unlock logic $332_{1-3}$ is configured to test and/or otherwise determine a computing platform for its respective node 310, 312 and 314 and, based on the determined platform, unlock the respective product $330_{1-3}$ without key authentication. For example, in some embodiments, if the particular node comprises a virtual input/output server (VIOS), unlock logic 332 may be configured to unlock the product 330 without key authentication.

Cluster device manager 336 is configured to perform various cluster processes such as, but not limited to, initiating and/or creating a cluster, determining whether the particular node is part of a cluster, and initiating the unlocking of a product 330. For example, cluster device manager 336 may be used to initiate a cluster and transmit requests and/or status information to other nodes for joining the cluster or for performing other processes related to the created cluster.

In operation, one of nodes 310, 312 or 314 may initiate and/or create a clustered network environment via a respective cluster device manager $336_{1-3}$. In some embodiments, in response to the creation of a cluster, an unlock process is initiated for a respective product $330_{1-3}$. It should be understood that any of nodes 310, 312 or 314 may initiate the cluster. Thus, for ease of description and illustration, the following example includes node 310 initiating the cluster. During and/or in response to initiating a clustered environment, node 310 initiates the unlock process of product $330_1$. For example, in some embodiments, device manager $336_1$ may interface with unlock logic $332_1$ and/or key logic $334_1$ to initiate key generation and authentication. As described above, key logic $334_1$ generates a unique encrypted key and passes the key to unlock logic $332_1$. Unlock logic $332_1$ decrypts the key and authenticates the key to product $330_1$. If authentication is successful, unlock logic $332_1$ unlocks the product $330_1$.

In response to unlocking of product $330_1$, unlock logic $332_1$ writes a status indication to shared storage device 320 indicating the unlocked status of product $330_1$. Further, unlock logic $332_1$ transmits and/or causes to be transmitted (e.g., by device manager $336_1$) a self-unlock request and/or message to other nodes of the cluster (e.g., nodes 312 and 314). For ease of description and illustration, the following example includes node 312 receiving the self-unlock request; however, it should be understood that a similar process may be performed by node 314. Upon receipt of the self-unlock request, node 312 invokes device manager $336_2$ which in turn initiates a self-unlock of product $330_2$ by interfacing with shared storage device 320 and acquiring and/or otherwise determining the unlock status indication for product $330_2$. In response to validating the unlocked status indication for product $330_2$ from shared storage device 320, device manager $336_2$ invokes unlock logic $332_2$, which then interfaces with key logic $334_2$ to generate and authenticate the key for product $330_2$. If authentication is successful, unlock logic $332_2$ unlocks product $330_2$.

On a subsequent re-boot of a particular node (e.g., node 312), device manager $336_2$ verifies the existence of the cluster and interfaces with shared storage device 320 to acquire and/or otherwise determine the unlock status indication for product $330_2$. In response to validating the unlocked status indication for product $330_2$ from shared storage device 320, device manager $336_2$ invokes unlock logic $332_2$, which then interfaces with key logic $334_2$ to generate and authenticate the key for product $330_2$. If authentication is successful, unlock logic $332_2$ unlocks product $330_2$.

Figure 4:
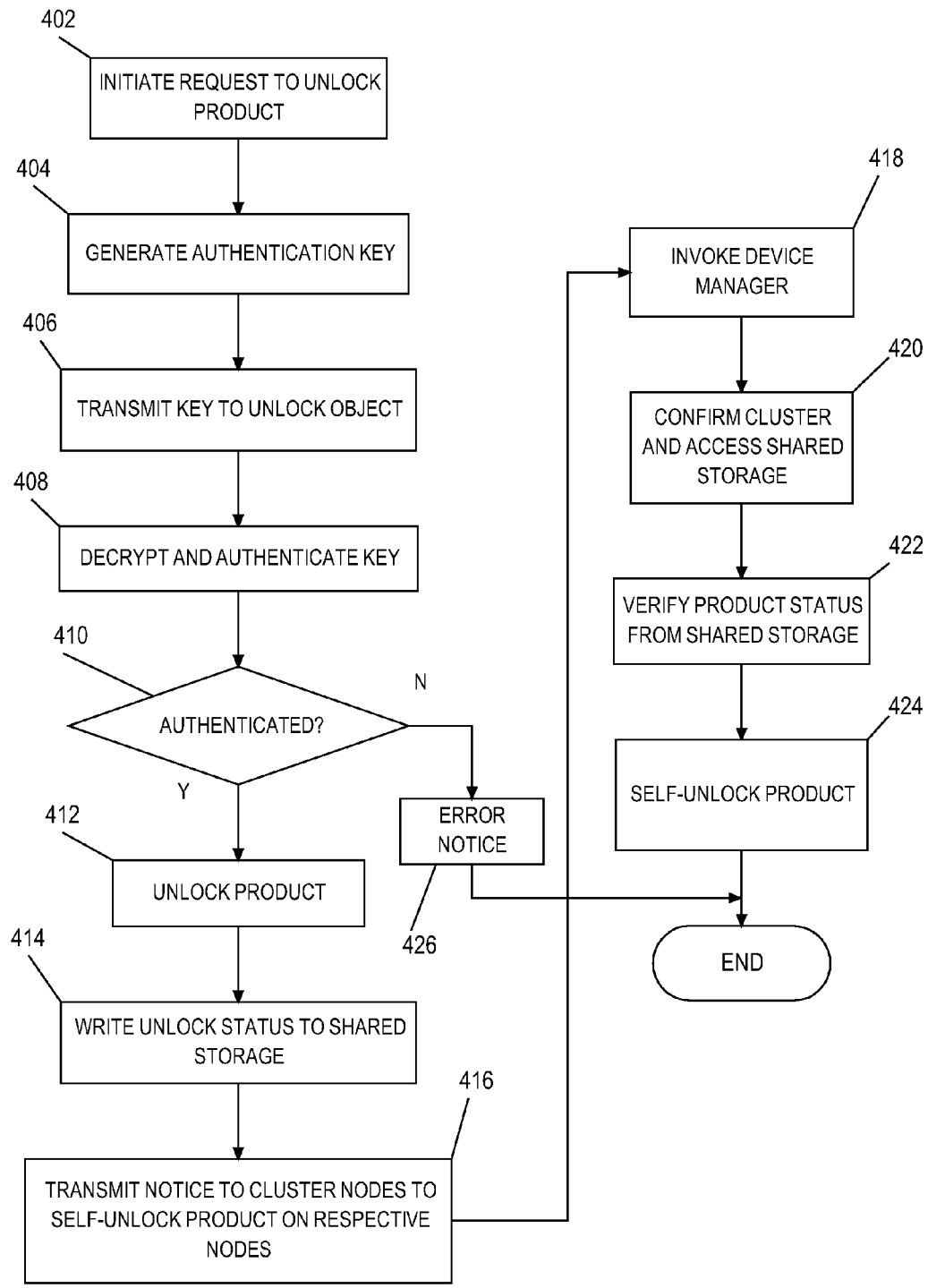
FIG. 4 is a flow diagram illustrating an embodiment of a product license management method.

FIG. 4 is a flow diagram illustrating an embodiment of a method for product license management. The method begins at block 402, where one of nodes 310, 312 or 314 initiates and/or creates a clustered network environment and/or initiates an unlock process for a respective product 330. At block 404, device manager $336_1$ interfaces with unlock logic 332 and/or key logic 334 to initiate key generation and authentication. As described above, key logic 334 generates a unique encrypted key and passes the key to unlock logic 332 at block 406. At block 408, unlock logic 332 decrypts the key and authenticates the key to the respective product 330. At decisional block 410, a determination is made whether authentication of the key was successful. If not, the method proceeds to block 426 where a failure or error notice may be generated. If authentication was successful, the method proceeds from decisional block 410 to block 412, where unlock logic 332 unlocks the product 330.

At block 414, unlock logic 332 writes a status indication to shared storage device 320 indicating the unlocked status of product 330. At block 416, unlock logic 332 transmits and/or causes to be transmitted (e.g., by device manager 336) a self-unlock request and/or message to other nodes of the cluster. At block 418, in response to receipt of the self-unlock request, the receiving node invokes its device manager 336, which in turn initiates a self-unlock of its product 330 by interfacing with shared storage device 320 to acquire and/or otherwise determine the unlock status indication for product 330 at block 420. At block 422, the node validates the unlocked status indication for product 330 from shared storage device 320. In response to validating the unlocked status of the product 330, device manager 336 invokes unlock logic 332 on the respective node, which then interfaces with key logic 334 to generate and authenticate the key for product 330 on the respective node and, if authentication is successful, unlock the product 330 at block 424.

Figure 5:
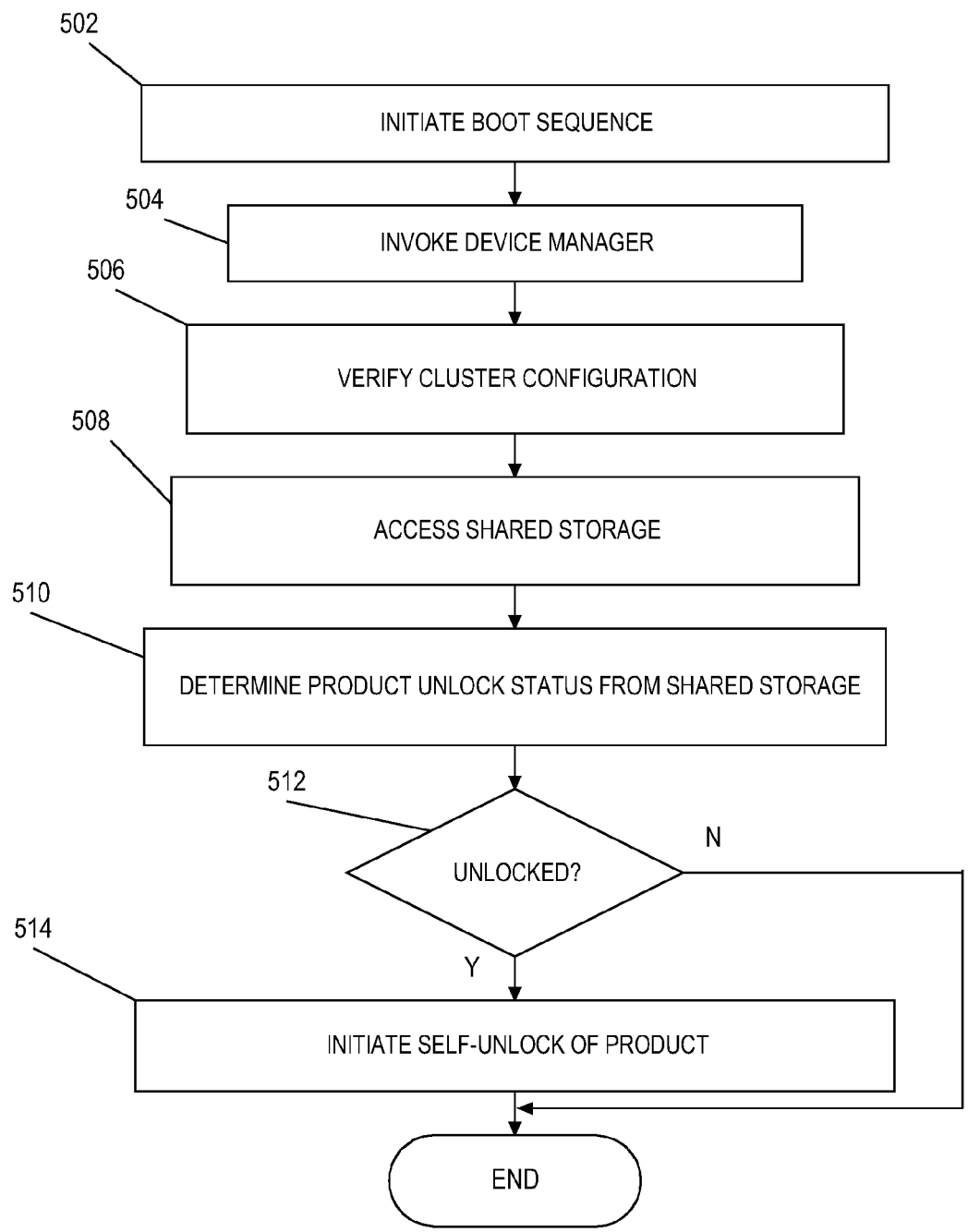
FIG. 5 is a flow diagram illustrating another embodiment of a product license management method.

FIG. 5 is a flow diagram illustrating an embodiment of a method for product license management. The method begins at block 502, where a boot sequence is initiated at a particular node (e.g., one of nodes 310, 312 or 314). At block 504, device manager 336 in invoked. At block 506, device manager 336 verifies the existence of the cluster, and at block 508 device manager 336 interfaces with shared storage device 320. At block 510, device manager 336 acquires and/or otherwise determines the unlock status indication for product 330. At decisional block 512, if the status for product 330 indicates unlocked, the method proceeds to block 514, where device manager 336 invokes unlock logic 332, which then interfaces with key logic 334 to generate and authenticate the key for product 330 and, if authentication is successful, unlock logic 332 unlocks product 330. If at decisional bock 512 a determination is made that the product 330 status is not unlocked, the method ends.

Thus, embodiments of the present disclosure enable product license management across multiple independent nodes without the use of a dedicated license server hosting an instance of a licensed product. Embodiments of the present disclosure enable product unlocking from any node of a cluster such that the unlocking permeates to the other nodes in the cluster without external support from a user or administrator. Further, embodiments of the present disclosure enable product unlocking to be preserved across a reboot of a particular node of the cluster.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a clustered environment having a plurality of nodes, the method comprising:
   unlocking a product on a first node of the plurality of clustered nodes;
   responsive to unlocking the product on the first node, indicating an unlocked status of the product on a shared storage device accessible to the plurality of clustered nodes; and
   transmitting a self-unlock message from the first node to remaining nodes of the cluster to enable the remaining nodes of the cluster to self-unlock the product on the respective remaining nodes based on the status indication of the shared storage device.

2. The method of claim 1, further comprising providing an interface on the first node for unlocking the product on the first node.

3. The method of claim 2, further comprising unlocking the product on the first node by the interface based on authentication of an encrypted key.

4. The method of claim 2, further comprising:
   determining, by the interface, a platform of the first node; and
   unlocking the product based on the determined platform.

5. The method of claim 1, further comprising:
   responsive to receiving at one of the remaining nodes the self-unlock message, verifying the cluster creation;
   verifying the unlocked status indication from the shared storage device; and
   responsive to verifying the unlocked status, self-unlocking the product on the one of the remaining nodes.

6. The method of claim 5, further comprising unlocking the product on the one of the remaining nodes based on authentication of an encrypted key.

7. The method of claim 1, further comprising creating, by the first node, the clustered environment having the plurality of nodes.

8. A system comprising:
   a first node couplable to at least one other node in a clustered network environment; and
   a shared storage device accessible by the first node and the at least one other node; and
   wherein the first node comprises logic executable to:
      create the clustered environment with the at least one other node;
      unlock a product on the first node;
      responsive to unlocking the product on the first node, indicate an unlocked status of the product on the shared storage device; and
      transmit a self-unlock message to the at least one other node to enable the at least one other node to self-unlock the product on the at least one other node based on the status indication of the shared storage device.

9. The system of claim 8, wherein the first node further comprises logic executable to unlock the product based on authentication of an encrypted key.

10. The system of claim 8, wherein the first node further comprises logic executable to:
    determine a platform of the first node; and
    unlock the product based on the determined platform.

11. The system of claim 8, wherein the at least one other node comprises logic executable to:
    responsive to receiving the self-unlock message, verify the cluster creation;
    verify the unlocked status indication from the shared storage device; and
    responsive to verifying the unlocked status, self-unlock the product on the at least one other node.

12. The system of claim 11, wherein the at least one other node comprises logic executable to unlock the product based on authentication of an encrypted key.

13. A computer program product for product license management in a clustered network environment having a plurality of nodes, the computer program product comprising:
    a computer readable storage device having computer readable program code embodied therewith, the computer readable program code comprising computer readable program code configured to:
       unlock a product on a first node of the plurality of clustered nodes;
       responsive to unlocking the product on the first node, indicate an unlocked status of the product on a shared storage device accessible to the plurality of clustered nodes; and
       transmit a self-unlock message from the first node to remaining nodes of the cluster to enable the remaining nodes of the cluster to self-unlock the product on the respective remaining nodes based on the status indication of the shared storage device.

14. The computer program product of claim 13, wherein the computer readable program code is configured to unlock the product based on authentication of an encrypted key.

15. The computer program product of claim 13, wherein the computer readable program code is configured to:
    determine a platform of the first node; and
    unlock the product based on the determined platform.

16. The computer program product of claim 13, wherein the computer readable program code is configured to create, by the first node, the clustered environment having the plurality of nodes.

17. A method, comprising:
    receiving, at a first node, a message from a second node in a clustered network environment to self-unlock a product on the first node;
    accessing a shared storage device of the clustered network;
    validating a product unlock status indication in the shared storage device; and
    responsive to validating the product unlock status, self-unlocking the product on the first node.

18. The method of claim 17, further comprising providing an interface on the first node for unlocking the product on the first node.

19. The method of claim 18, further comprising unlocking the product on the first node by the interface based on authentication of an encrypted key.

20. The method of claim 18, further comprising:
    determining, by the interface, a platform of the first node; and
    unlocking the product based on the determined platform.

* * * * *